(12) United States Patent
Xu et al.

(10) Patent No.: US 10,768,406 B2
(45) Date of Patent: Sep. 8, 2020

(54) IMAGING SYSTEM

(71) Applicant: Scanogen Inc., Baltimore, MD (US)

(72) Inventors: Zhiguang Xu, Malvern, PA (US); Alfredo Andres Celedon, Columbia, MD (US)

(73) Assignee: Scanogen Inc., Baltimore, MD (US)

( * ) Notice: Subject to any disclaimer, the term of this patent is extended or adjusted under 35 U.S.C. 154(b) by 351 days.

(21) Appl. No.: 15/444,462

(22) Filed: Feb. 28, 2017

(65) Prior Publication Data

US 2017/0363851 A1 Dec. 21, 2017

Related U.S. Application Data

(60) Provisional application No. 62/352,222, filed on Jun. 20, 2016.

(51) Int. Cl.
*G02B 21/36* (2006.01)
*G02B 21/06* (2006.01)
(Continued)

(52) U.S. Cl.
CPC ............ *G02B 21/361* (2013.01); *G01B 9/04* (2013.01); *G02B 21/06* (2013.01); *G02B 21/16* (2013.01); *G02B 21/365* (2013.01)

(58) Field of Classification Search
CPC .... G02B 21/361; G02B 21/16; G02B 21/365; G02B 21/06; G01B 9/04
See application file for complete search history.

(56) References Cited

U.S. PATENT DOCUMENTS

2004/0073120 A1* 4/2004 Motz .................... A61B 5/0071
600/478
2012/0248292 A1 10/2012 Ozcan et al.
(Continued)

OTHER PUBLICATIONS

Luis (Nuclear Segmentation in Microscope Cell Images: A Hand-Segmented Dataset and Comparison of Algorithms—978-1-4244-3932-4/09 Published in IEEE in 2009) (Year: 2009).*
(Continued)

*Primary Examiner* — Nasim N Nirjhar
(74) *Attorney, Agent, or Firm* — McDermott, Will & Emery LLP; Judy M. Mohr; Ricardo J. Claps (57) ABSTRACT

An imaging system is described for measuring the position or movement of a particle having a size of less than about 20 microns. The system comprises an optional sample holder configured to hold a sample with a particle, an optional illumination source configured to illuminate the sample, a lens having a magnification ratio from about 1:5 to about 5:1 and configured to generate the image of the sample, an image sensor having a pixel size of up to about 20 microns and configured to sense the image of the sample, and an image processor operatively connected to the image sensor to process the image of the particle in order to determine the position or movement of the particle. The dimension of the image of each particle is at least about 1.5 times the dimension of the particle multiplied by the magnification ratio of the lens, and the image of each particle is distributed on at least two pixels of the sensor. The imaged area of the sample is at least about one millimeter squared.

35 Claims, 5 Drawing Sheets

(51) Int. Cl.
  *G01B 9/04* (2006.01)
  *G02B 21/16* (2006.01)

(56) References Cited

U.S. PATENT DOCUMENTS

| | | | | |
|---|---|---|---|---|
| 2012/0312957 | A1* | 12/2012 | Loney | G02B 21/245 |
| | | | | 250/201.3 |
| 2013/0294645 | A1* | 11/2013 | Sibarita | G02B 21/0076 |
| | | | | 382/103 |
| 2014/0030737 | A1* | 1/2014 | Holmes | G01N 21/17 |
| | | | | 435/7.24 |
| 2014/0327687 | A1* | 11/2014 | Murakami | G06F 3/14 |
| | | | | 345/545 |
| 2014/0354994 | A1* | 12/2014 | Ahner | G01N 21/47 |
| | | | | 356/369 |
| 2016/0258003 | A1 | 9/2016 | Celedon et al. | |
| 2016/0350937 | A1* | 12/2016 | Balagurusamy | G02B 21/367 |

OTHER PUBLICATIONS

Dietrich et al., "A New Optical Method for Characterizing Single Molecule Interactions Based on Dark Field Microscopy", Proc. SPIE, vol. 6444, Ultrasensetive and Single Molecule Detection Technologies II, No. 644403, doi:10.1117/12.699040, pp. 64403-1 to 644403-8 (2007).

\* cited by examiner

IMAGING SYSTEM

CROSS REFERENCE TO RELATED APPLICATIONS

The present application claims the benefit of U.S. application Ser. No. 62/352,222 filed Jun. 20, 2016, the content of which is incorporated herein by reference.

STATEMENT REGARDING FEDERALLY SPONSORED RESEARCH OR DEVELOPMENT

This invention was made with government support under Grant No. 1R43AI122527-01 awarded by the National Institutes of Health. The government has certain rights in the invention.

FIELD OF THE INVENTION

This invention is generally in the field of imaging techniques and relates to an imaging device and system to measure the position or movement of small particles in a sample.

BACKGROUND OF THE INVENTION

Measuring the position and movement of small particles is essential in many scientific fields. Typical examples are microbead tracking and cell tracking in biomedical research. Microbeads are uniform polymer particles of about 0.3 to 500 microns in diameter, which can be used to absorb or couple with bio-reactive molecules such as proteins or nucleic acids. Microbeads are used to track the position of biomolecules in single molecule manipulation experiments. In such an application, microbeads are pre-coupled with a ligand, a biomolecule such as an antibody, streptavidin, protein, antigen, DNA/RNA or other molecule, which binds to the desired target molecule. The whole assembly can be manipulated precisely with a magnetic or optical field. An example of cell tracking is the sperm motility test, in which the count, shape, and movement of sperm cells are measured to evaluate the health status of the sperm, in order to provide information for infertility treatment.

In these applications, high accuracy of the position measurement of the particles and large field of view are two desirable specifications. The accurate position of the investigated particles can be computed to derive precisely the movement, trajectory, speed, acceleration or other behavior of the particles. The large field of view enables a large number of particles to be characterized, which can significantly enhance the statistics, precision, sensitivity, and certainty of the system. For instance, if thousands or tens of thousands of sperm can be characterized simultaneously in one motility test, more precise conclusions can be drawn from the evaluation.

Unfortunately, the concepts of high accuracy of the position measurement of the particles and large field of view often conflict in traditional imaging systems. To accurately calculate the position or movement of the particle, a magnified image of the particle is preferred. The larger the image of the particle, and the more pixels the image covers in the image sensor, the more precise can the position of the particle be calculated. However, the use of high magnification reduces the field of view to the size of the image sensor divided by the magnification ratio.

A lens-free technique is described in US20120248292A1 to obtain a large field of view with high-resolution image of small particles, but the investigated sample has to be located on the surface of the image sensor without any gap. As a result, the image sensor has to be replaced in each test, which is very costly and the imaging system is difficult to configure. For instance, most commercially available image sensors have a transparent window enclosing the sensor chip, and this window has to be removed to locate the sample at the surface of the chip. What is needed then is a system which is easy to build without the need to locate the sample adjacent to the image sensor, to obtain both high-accuracy position measurement of small particles and a large field of view.

SUMMARY OF THE INVENTION

In one aspect, the present invention provides an imaging system for determining the position or movement of a particle in a sample, comprising:
 a. an optional sample holder configured to hold a sample containing a particle;
 b. an optional illumination source configured to illuminate the sample;
 c. a lens having a magnification ratio of from about 1:5 to about 5:1 and configured to generate an image of the particle in the sample, wherein the dimension of the image of the particle is at least about 1.5 times the dimension of the particle multiplied by the magnification ratio of the lens, and wherein the size of the particle is less than about 20 microns, and wherein the imaged area of the sample is at least about one $mm^2$;
 d. an image sensor having a pixel size of less than about 20 microns and configured to sense the image of the particle, wherein the image of the particle is distributed on at least two pixels; and
 e. an image processor operatively connected to the image sensor to process the image of the particle in order to determine the position or movement of the particle.

In another aspect, the present invention provides a method of determining the position or movement of a particle in a sample, comprising the steps of:
 a. providing a sample having a particle, wherein the size of the particle is less than about 20 microns;
 b. optionally illuminating the sample;
 c. generating an image of the particle with a lens having a magnification ratio of from about 1:5 to about 5:1, wherein the dimension of the image of the particle is at least about 1.5 times the dimension of the particle multiplied by the magnification ratio of the lens, and wherein the imaged area of the sample is at least about 1 $mm^2$;
 d. sensing the image of the particle on at least two pixels of an image sensor having a pixel size of less than about 20 microns; and
 e. processing the image of the sample to measure the position or movement of the particle.

DETAILED DESCRIPTION OF THE INVENTION

The present invention provides a system that is capable of measuring the position or movement of small particles over a large area with a high degree of accuracy. Preferably, the particle size is less than about 20 microns, more preferably from about 0.5 microns to about 2 microns. In certain embodiments, the magnification of the imaging system is equal to or smaller than about 1:1, which provides that the field of view is at least the size of the image sensor. In addition, the numeric aperture of the lens is sufficiently small, and the imaging system has a sufficiently low optical resolution, to result in a blurred image of each individual particle. In this instance, the size of the blurred image is larger than the dimension of the particle multiplied by the magnification ratio of the imaging system. Further, in certain embodiments an image sensor with a small pixel size is used, which results in the intensity of the image being distributed on multiple pixels. The signals from these multiple pixels are analyzed to obtain accurate position or movement of each particle. The present invention thus allows for precise positioning of a large number of small particles in a large field of view.

Field of view is the area of the object under inspection that an imaging system can acquire. In a preferred embodiment, the field of view will encompass from about 100 to about 1 million particles in the imaged area of the sample.

A lens is a transmissive optical device that affects the focus of a light beam through refraction, so it can focus light to form an image. Lenses are made from transparent materials such as glass, ground and polished to a desired shape.

The magnification ratio of a lens is the ratio of the apparent size of an object (or its size in an image) to its true size, and thus it is a dimensionless number.

The numerical aperture (NA) of a lens is a dimensionless number that characterizes the range of angles over which the lens can accept light. Mathematically, NA is equal to n*sin θ, where n is the index of refraction of the lens medium, and θ is the maximal half-angle of the cone of light that can enter the lens.

The optical resolution of an imaging system describes its ability to resolve detail in the object that is being imaged, which is defined by the distance between two distinguishable radiating points. Mathematically, optical resolution is equal to 0.61λ/NA, where λ is the light wavelength and NA is the numerical aperture of the lens. In general, high optical resolution results in a sharp image with more details distinguished, and low optical resolution leads to a blurred image.

In a preferred embodiment, a lens with a sufficiently small numerical aperture is employed to make the optical resolution sufficiently low, which results in blurred images of the small particles.

Figure 1A:
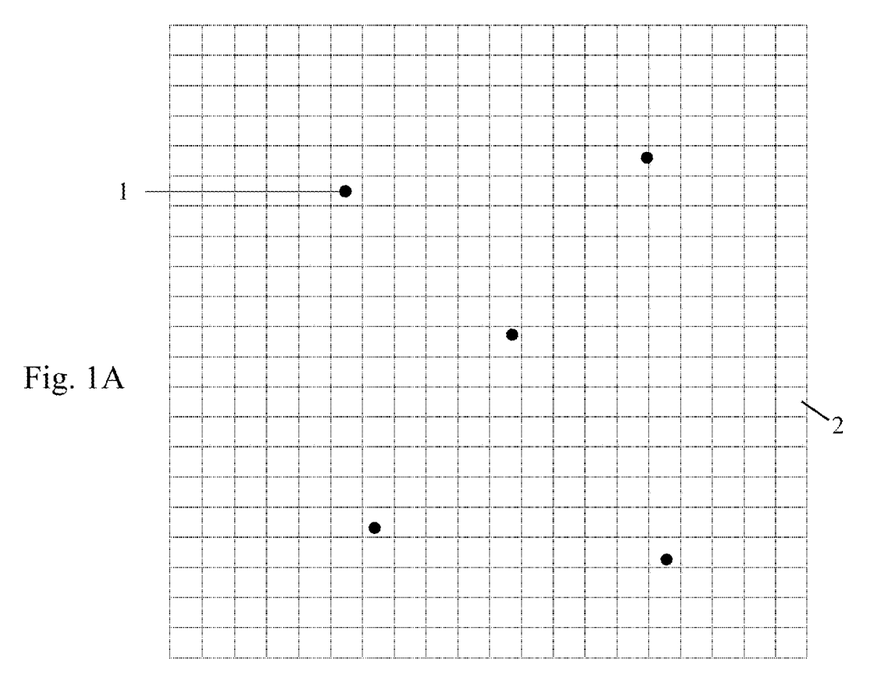
FIG. 1A is a representative view of a sample with small particles.
Figure 1B:
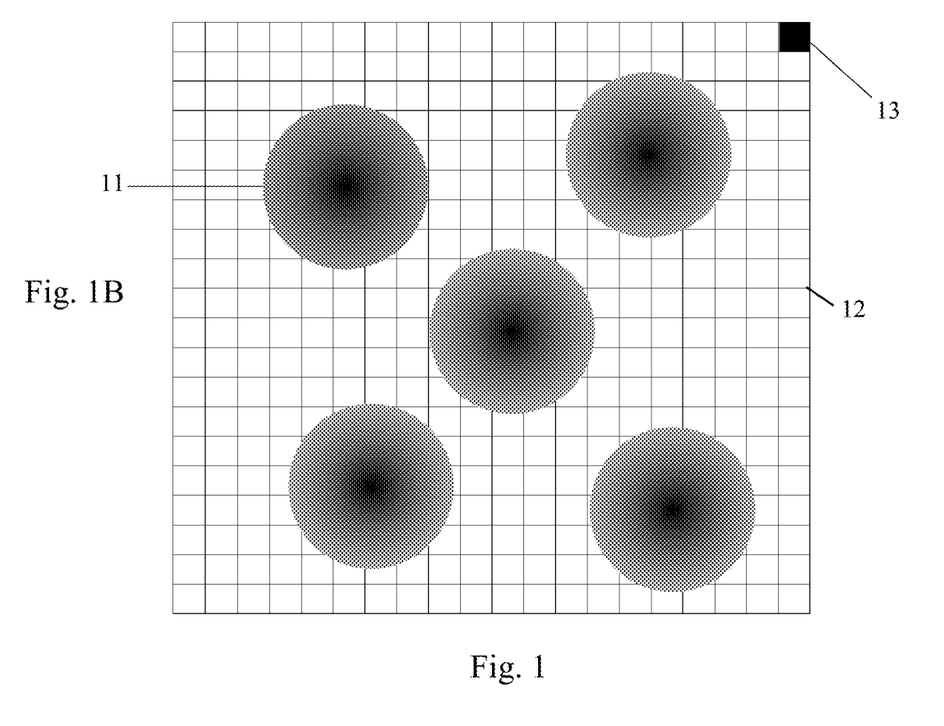
FIG. 1B is a representative view of the images of the small particles on an image sensor. The actual size of the particle is smaller than the pixel size of the sensor. The dimension of the image of each particle is larger than the actual dimension of the particle multiplied by the magnification ratio of the lens because of the blurring effect caused by the low optical resolution of the imaging system.

Referring now to the Figures, FIG. 1A represents an area in the sample containing five small particles, including particle 1. FIG. 1B represents the image of the sample formed at the image sensor 12 with 1:1 magnification. The image comprises multiple pixels (one of which is shown filled in at 13). In FIG. 1A, virtual grid 2 shows the scale of the sample, and one square in the virtual grid has the same size of one pixel in the sensor according to 1:1 magnification. The actual size of the particle is smaller than the pixel size of the sensor. Particle 1 is located at approximately the center of its corresponding grid unit. In FIG. 1B, image 11 is the image of the small particle 1, and the size of image 11 is larger than the actual dimension of particle 1 multiplied by the magnification ratio of the lens (equal to 1 in the depicted case) because of the blurring effect. Image sensor 12 has a sufficiently small pixel size such that the intensity of the blurred image 11 is distributed on multiple pixels. Preferably, the pixel size is less than about 20 microns, more preferably less than about 5 microns.

Figure 1C:
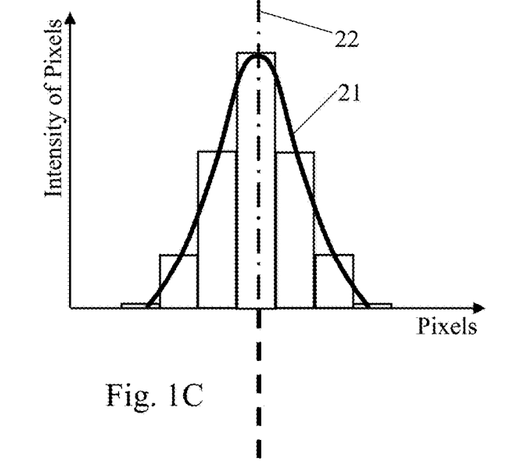
FIG. 1C depicts the intensity of the blurred image of a small particle distributed on multiple pixels of a sensor when low optical resolution is applied. The intensity distribution is only shown in one dimension. A Gaussian profile is used to fit the intensity distribution, in order to permit precise measurement of the particle position.
Figure 1D:
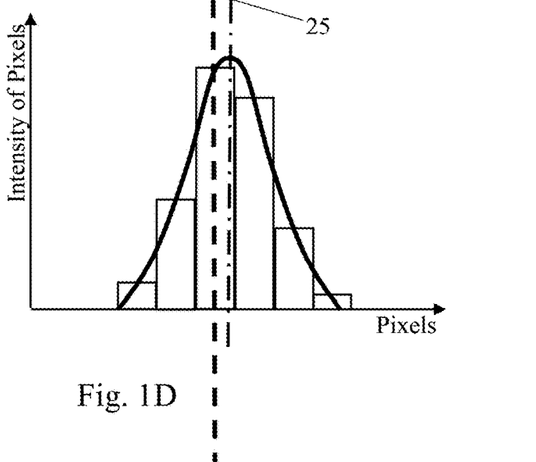
FIG. 1D depicts the intensity of the blurred image of a small particle distributed on multiple pixels of the sensor when the particle moves a distance of about ⅓ of the pixel size from its initial position depicted in FIG. 1C. The intensity distribution is only shown in one dimension. Using a Gaussian profile to fit the intensity distribution can distinguish the movement of the particle with a high degree of precision.

Based on the intensity profile distributed on these multiple pixels, the position of particle 1 can be calculated with high precision. For example, fitting a Gaussian model of the profile (21 in FIG. 1C) to fit the actual intensity of the image of the particle, can be utilized to calculate the position of the particle (22 in FIG. 1C) more precisely. FIG. 1D shows the position measurement when particle 1 moves a distance of about ⅓ of the pixel size from its initial position in FIG. 1C, and its new position (25 in FIG. 1D) can be measured with high precision. The intensity distribution is only shown in one dimension in FIG. 1C and FIG. 1D. Therefore, imaging with low optical resolution that results in blurred particle images allows for high precision (sub-pixel) particle position measurements.

Figure 1E:
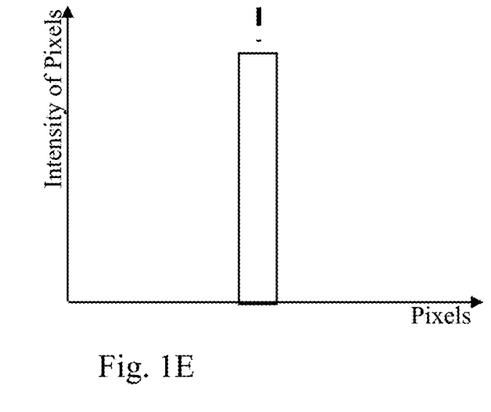
FIG. 1E depicts the intensity of the sharp image of a small particle distributed on one pixel of the sensor when high optical resolution is applied as in a traditional imaging system. The intensity distribution is only shown in one dimension. Because the intensity of the image of the particle is only located at one pixel, the precision of the position cannot be higher than the pixel size.
Figure 1F:
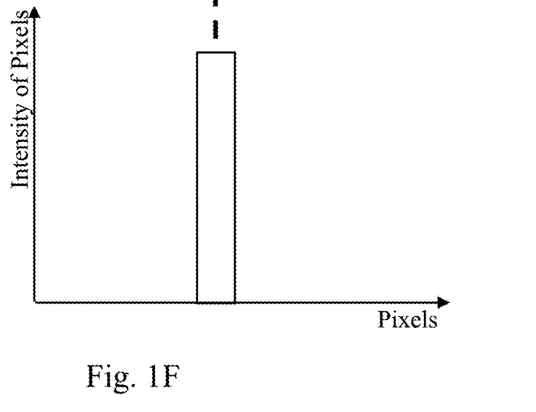
FIG. 1F depicts the intensity of the sharp image of a small particle distributed on one pixel of the sensor when the particle moves a distance of about ⅓ of the pixel size from its initial position depicted in in FIG. 1E. The intensity distribution is only shown in one dimension. Because the image of the particle is still located at the same single pixel, the movement of this particle cannot be detected.

Instead, FIG. 1E and FIG. 1F show the position measurement when high optical resolution is used as in conventional imaging systems. High optical resolution results in the image size of particle 1 being equal to the actual dimension of particle 1 multiplied by the magnification ratio of the lens (equal to 1 in this case), and thus the intensity of the image of the particle is only located within one pixel. As a result, the precision of its position cannot be better than one pixel size. When the particle moves a distance of about ⅓ of the pixel size, this movement cannot be detected because the image of the particle is still located within the same single pixel.

The blurring effect caused by low optical resolution is advantageous in this invention. The advantage of this invention is demonstrated in FIG. 1—with 1:1 magnification, the field of view is kept as the same size of the image sensor without any compromise, but the image of the particle is enlarged to help measure the position of the particle more precisely.

Figure 2:
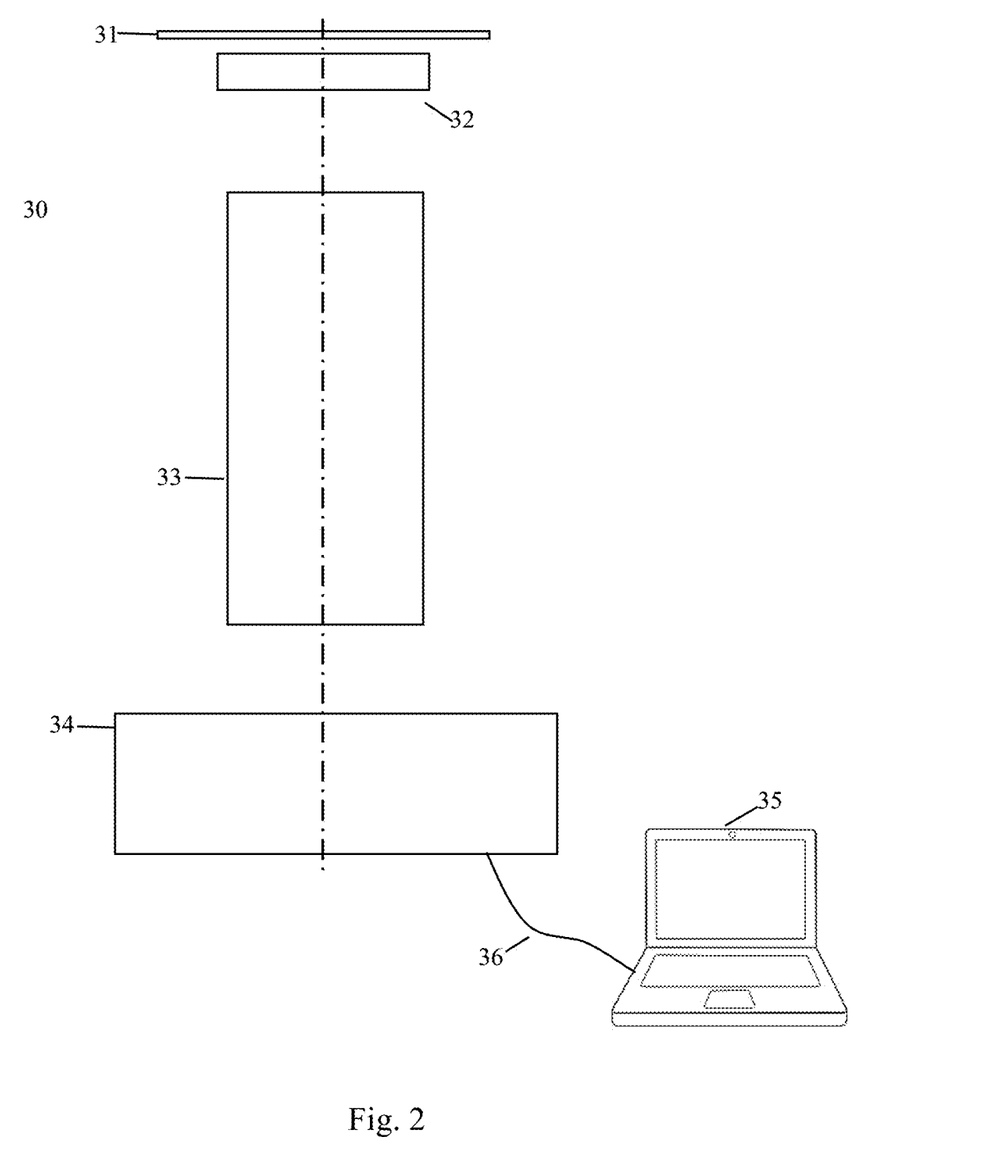
FIG. 2 is a schematic representation of one embodiment of the imaging system (30). The system comprises a sample holder (31) to hold a sample with small particles, an illumination source (32) to illuminate the sample, a lens (33) to generate an image of the sample, an image sensor (34) to sense the image of the sample, and an image processor (35) to process the image or images of the sample to measure the position or movement the particles, and an optional cable (36) connecting the image sensor (34) and the image processor (35).

FIG. 2 depicts one preferred configuration of the imaging system. The sample holder 31 contains the sample to be imaged, and small particles are present in the sample. The precise structure of the sample holder is not critical, and could include, e.g., a capillary or glass slide. Illumination source 32 is used to illuminate the sample, if needed. Lens 33 is configured to generate an image of the sample. Sensor 34 is configured to sense the image of the sample generated by lens 33. Image processing unit 35 processes the image or images of the sample to determine the position or movement the particles. In this figure, the image processing unit is depicted as a laptop computer, but one of ordinary skill would recognize that many other computing devices could be utilized, such as a desktop computer, a tablet computer, a smartphone, an embedded processor in an embedded system, etc. Optional cable 36 connects the image sensor 34 and the image processor 35; however it will be appreciated that the particular connection means is not critical, and a wireless connection may be used, if desired.

Figure 3:
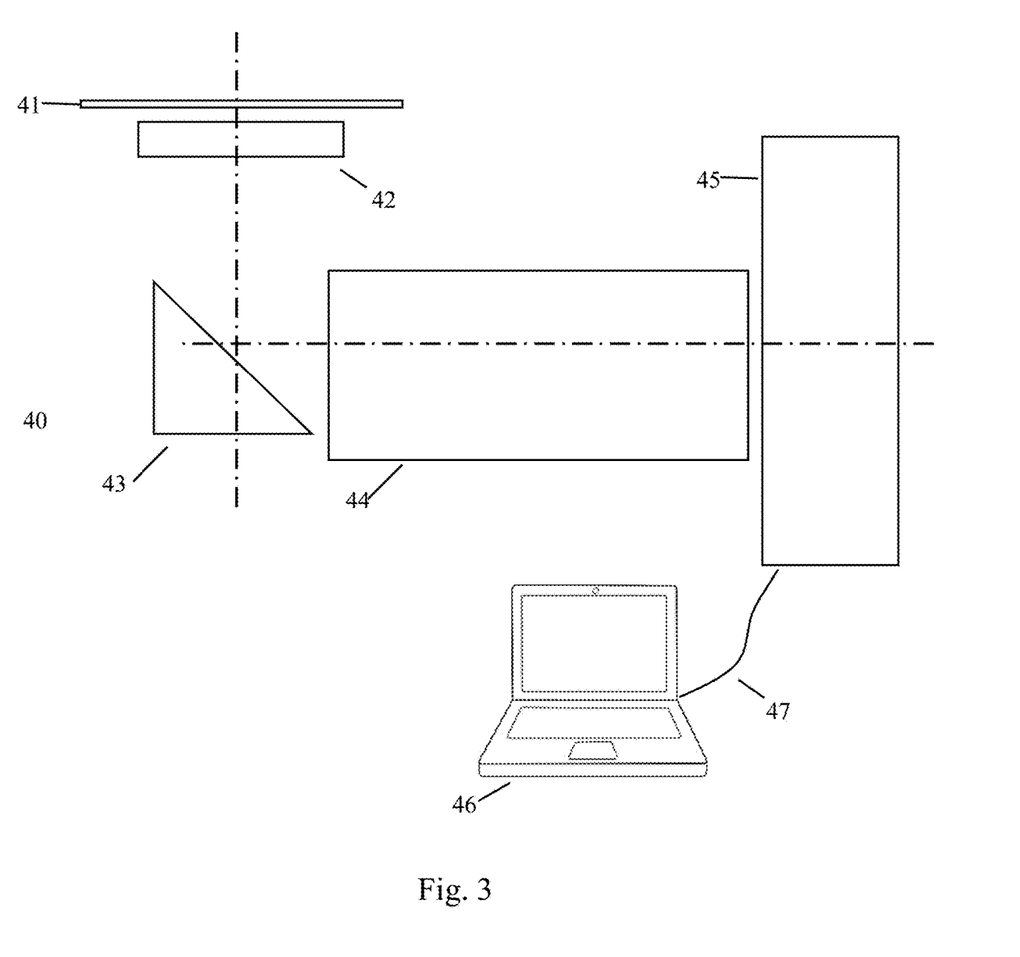
FIG. 3 is a schematic representation of another embodiment of the imaging system (40). The system comprises an optional sample holder (41) to hold a sample with small particles, an optional illumination source (42) to illuminate the sample, a reflecting mirror (43) to fold the optical path, a lens (44) to generate the image of the sample, an image sensor (45) to sense the image of the sample, and an image processor (46) to process the image or images of the sample to measure the position or movement the particles, and an optional cable connecting (47) the image sensor (45) and the image processor (46).

FIG. 3 depicts another preferred configuration of the imaging system. The sample holder 41 contains the sample to be imaged, and small particles are present in the sample. The precise structure of the sample holder is not critical, and could include, e.g., a capillary or glass slide. Illumination source 42 is used to illuminate the sample, if needed. Reflecting mirror 43 reflects the image of the sample and bends the optical path with an angle. Lens 44 is configured to generate the image of the sample. Image sensor 45 is configured to sense the image of the sample generated by lens 44. Image processing unit 46 is configured to process the image or images of the sample to determine the position or movement the particles. In this figure, the image processing unit is depicted as a laptop computer, but one of ordinary skill would recognize that many other computing devices could be utilized, such as a desktop computer, a tablet computer, a smartphone, an embedded processor in an embedded system, etc. Optional cable 47 connects the image sensor 45 and the image processor 46; however it will be appreciated that the particular connection means is not critical, and a wireless connection may be used, if desired.

A wide variety of lenses may be used, including a single lens, a compound lens comprising several simple lenses, or an objective lens. A single lens comprises a single piece of material, while a compound lens comprises several simple lenses (elements), usually along a common axis. An objective is the typical lens used in a microscope that gathers light from the object being observed and focuses the light rays to produce a real image.

A telecentric lens is a compound lens that has its entrance or exit pupil at infinity. The entrance pupil of a system is the image of the aperture stop as seen from a point on the optic axis in the object plane. The exit pupil of a system is the image of the aperture stop as seen from a point on the optic axis in the image plane.

An object space telecentric lens is one type of telecentric lens with its entrance pupil at infinity, which is obtained by positioning the stop aperture on the focal plane of the front optical group of the telecentric lens. An object space telecentric lens makes objects appear to be the same size independent of their location in space, which removes the perspective error that makes closer objects appear to be larger than objects farther from the lens.

An image space telecentric lens is one type of telecentric lens with its exit pupil at infinity, which is obtained by positioning the stop aperture on the focal plane of the back optical group of the telecentric lens. An image space telecentric lens makes objects appear to be the same size independent of the placement of the sensor plane, which means that sensor placement tolerance for cameras is not as important, as a small shift toward or away from optimal position will not cause a difference in magnification.

A double telecentric lens is one type of telecentric lens with both its entrance and exit pupils at infinity, which is obtained by positioning the stop aperture on the focal plane of both the front and back optical groups of the telecentric lens. A double telecentric lens has the advantage of both an object space telecentric lens and an image space telecentric lens, as the field of view is unaffected by shifts of the object position or the sensor position. It has other advantages including lower image distortion, higher accuracy in object edge position, and increased depth of field. Depth of field, also called focus range or effective focus range, is the distance between the nearest and farthest objects in a scene that appear acceptably sharp in an image.

Bright-field illumination is the simplest of all the microscopy illumination techniques. The most popular bright-filed illumination is transmitted light (i.e., illuminated from below and observed from above or illuminated from above and observed from below) and contrast in the sample is caused by absorbance of some of the transmitted light in dense areas of the sample. The typical appearance of a bright-field microscopy image is a dark sample on a bright background.

Dark-field illumination is a specialized illumination technique that capitalizes on oblique illumination to enhance contrast in specimens. The straight light passing through the specimen from oblique angles cannot enter the microscope lens; only the scattered light from the specimen can be collected by the lens. As a result, a bright image of the specimen superimposed onto a dark background is formed.

An LED ring light is an assembly of LED arranged in a ring style, which projects the illumination light to the sample with an oblique angle, usually between 50° and 90°.

An image sensor converts light into electrons and ultimately constitutes an image.

A CCD (charge-coupled device) sensor is one type of image sensor. When light strikes the chip it is held as a small electrical charge in each pixel, and the charges of all the pixels are transported across the chip and read at one corner of the array. Then, an analog-to-digital converter turns each pixel's value into a digital value. An advantage of a CCD sensor is its high image quality.

A CMOS (complementary metal-oxide semiconductor) sensor is another type of image sensor. Each pixel of a CMOS image sensor has its own charge-to-voltage conversion, and also has several transistors amplifying and manipulating the charge converted from light. The CMOS approach is more flexible because each pixel works individually. An advantage of a CMOS sensor is its low cost and low power consumption.

The image processor used in this invention can be a computer (for example, a laptop, desktop, tablet or smartphone) or an embedded processor. An embedded processor is a microprocessor that is used in an embedded system. These processors are usually smaller, consume less power, and use a surface mount form factor. The form factor is the size, configuration, or physical arrangement of a computing device. Embedded processors can be divided into two categories: ordinary microprocessors and microcontrollers. Microcontrollers have more peripherals on the chip. In essence, an embedded processor is a CPU chip used in a system which is not a general-purpose workstation, laptop or desktop computer.

The position of a particle in an image can be found by different image analysis procedures. In some embodiments of the present invention, the position of the particle corresponds to the center of the particle that is found by fitting a two dimensional Gaussian to the particle image. In other embodiments, the position of the particle corresponds to the center of the particle that is found by first generating a binary image and then finding the geometric center of the binary image of the particle. A binary image is generated from a grayscale image by assigning a value of one to pixels with intensity higher than a certain threshold, and a value zero to pixels with intensity lower than the threshold.

EXAMPLE

Figure 4A:
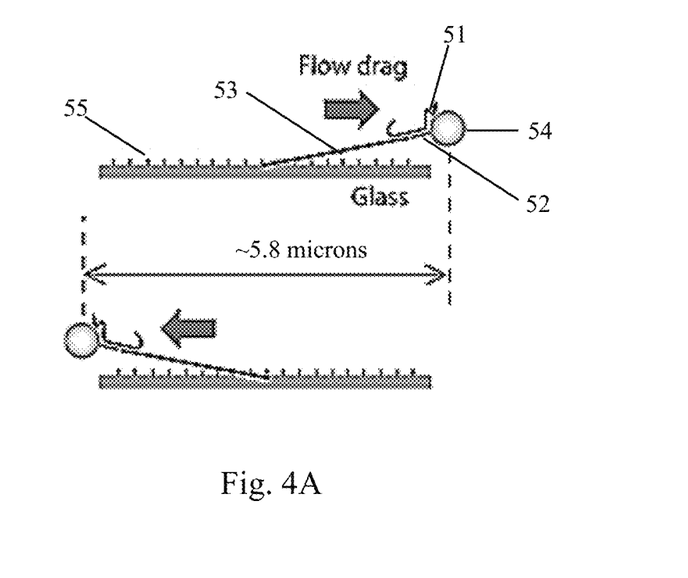
FIG. 4A depicts the displacement of a bead using an embodiment of the present invention. The bead (54) was hybridized with the first probe (52), the target (51), and the second probe (53) and tethered to the glass surface coated with protein (55). A first position for each bead was determined in images taken when the flow runs in one direction, and then a second position for each bead was determined in images taken when the flow runs in the opposite direction. Bead displacement is the distance between the first and second positions.

This example demonstrates detection of a 60 nucleotide (nt) synthetic DNA oligonucleotide target (51 in FIG. 4A) having the sequence of a section of *Mycobacterium tuberculosis* rRNA. The first probe (52 in FIG. 4A) was purchased from IDT and consisted of a 24 nt single stranded oligonucleotide having a sequence complementary to the 3' end of the target and a 5' biotin modification. The second probe (53 in FIG. 4A) was generated in the following manner: A plasmid (8.5 kbps) was linearized using the restriction enzyme BsmB I (New England Biolabs), which cut the plasmid twice generating a large fragment (~8.4 kbps~2.8 microns) with different 4 nt overhangs at each end, and a small fragment which was separated and discarded by agarose gel purification (QIAquick Gel Extraction Kit, Qiagen). The linearized plasmid was ligated using T4 ligase to two double stranded DNA fragments generated by hybridizing synthetic oligonucleotides. The first fragment had one end with an overhang compatible to one of the overhangs of the plasmid and the other end had a 30 nt overhang complementary to the 5' end of the target. The second fragment had one end with an overhang compatible to the other overhang of the plasmid, and the other end of the fragment had a 5' digoxigenin modification. The first probe was mixed with a solution containing the target and the temperature was raised to 65° C. for 1 minute and then incubated at room temperature for 10 minutes. The buffer contained 800 mM NaCl. A blocker oligonucleotide complementary to the first probe was added and incubated for 5 minutes. The second probe was added and incubated for 10 minutes. Super-paramagnetic beads (Life Technologies, 54 in FIG. 4A) coated with Streptavidin were added and incubated for 30 minutes. The mixture was then flowed into a glass capillary tube (5 mm×4 mm×0.2 mm) previously functionalized with anti-digoxigenin proteins (Roche, 55 in FIG. 4A) and beads were let sediment for 5 minutes. A 100 mM NaCl buffer solution was flowed to wash unbound beads. The beads were imaged first with flow in one direction (350 microliters/minute, 10 images), and then with flow in the opposite direction (350 microliters/minute, 10 images), as shown in FIG. 4A. The optical system used to image the beads comprised an LED ring light, a telecentric lens and a camera. The LED ring light provided a dark field illumination. The telecentric lens exhibited the same magnification for all the beads in the depth of field around 1 millimeter. The magnification of the system was 1:1, which helped to achieve a large field of view of 6.14 mm by 4.6 mm. According to the optical resolution of the lens, the image size of each particle was ~4 microns, which was sufficient to investigate the displacement of the particles. The camera used in the system had a 1/2.3 inch (6.14 mm by 4.6 mm) complementary metal oxide semiconductor (CMOS) chip, which had 4384 by 3288 pixels with pixel size of 1.4 microns.

Figure 4B:
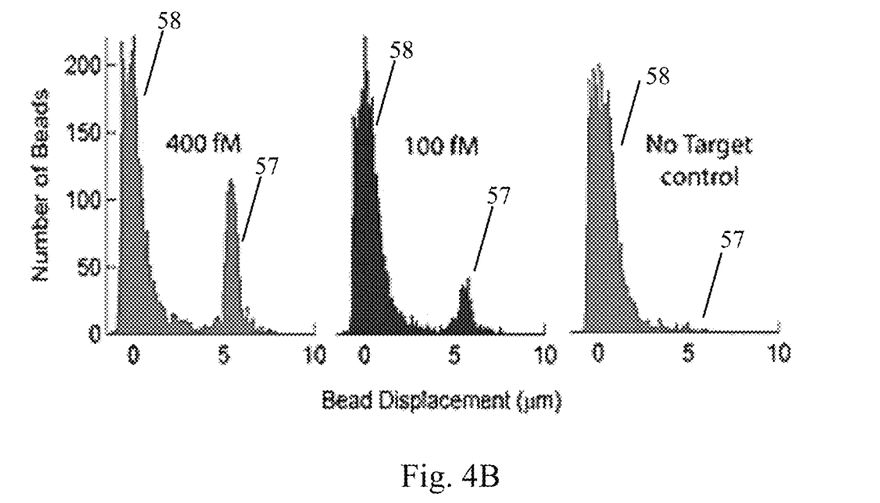
FIG. 4B shows histograms of bead displacement generated using an embodiment of the present invention, with the target concentration as 400 femtomolar (left), 100 femtomolar (middle) and 0 femtomolar (right). Beads that are displaced more than 5.8 microns by the flow indicate target presence, and form the peak on the right (57) in each histogram. Beads that are displaced less than 5.8 microns form a peak on the left (58) and correspond to beads attached to the glass via a non-specific interaction.

A custom code written in Matlab was used to analyze the images and determine the position and then displacement of most of the beads present in the field of view. The raw image of each particle was transformed to a binary image in which pixels with intensity higher than a certain threshold were assigned a value of one and pixels with intensity lower than the threshold were assigned a value of zero. The position of the particle was then calculated as the center of mass of the binary image of the particle. Beads that were too close to each other (less than about 6 microns) were not included in the analysis. The position of a bead was defined as the average of its position in the 10 images. This system allowed measurement of the displacement of over 10,000 beads in each experiment with sub-micron resolution. The code generated a histogram of bead displacement. FIG. 4B shows the detection of concentrations of 400 femtomolar, 100 femtomolar, and 0 femtomolar of the target, respectively. Beads that moved more than 5.8 microns were considered bound to a target-probe complex (right peak in the histogram, 57 in FIG. 4B), and the total number of these beads reflects the concentration of the target. Beads that moved less than 5.8 microns were considered non-specifically attached to the capillary surface (left peak in the histogram, 58 in FIG. 4B).

What is claimed is:

1. An imaging system, comprising:
   a. a sample holder configured to hold a sample containing a particle;

b. an illumination source configured to illuminate the sample;

c. a lens having a magnification ratio of from about 1:5 to about 5:1 and configured to generate a blurred image of the particle in the sample, wherein a dimension of the blurred image of the particle is greater than the dimension of the particle multiplied by the magnification ratio of the lens, and wherein a field of view in an image plane of the lens is larger than twice a size of the particle;

d. an image sensor having a pixel size of less than about the dimension of the blurred image of the particle and senses the blurred image of the particle, wherein an intensity of the blurred image of the particle is distributed on at least two pixels of the image sensor to form an intensity distribution; and e. an image processor operatively connected to the image sensor to process the blurred image of the particle and to find a center of an intensity distribution for multiple pixels of the image sensor within a high precision, sub-pixel particle position measurement resolution in order to determine a position or a movement of the particle, wherein a size of the particle is less than a dimension of about five pixels and wherein the center of the intensity distribution is found by at least one of a two dimensional fit to the intensity distribution and a geometric center of a bead image based on a threshold of the intensity distribution.

2. The imaging system of claim 1, wherein the sample holder is present and comprises a capillary or a glass slide.

3. The imaging system of claim 1, wherein the size of the particle is from about 0.5 microns to about 2 microns.

4. The imaging system of claim 1, wherein there are from about 100 particles to about 1 million particles in an imaged area of the sample.

5. The imaging system of claim 1, wherein the illumination source is present and provides a bright-field illumination or a dark-field illumination.

6. The imaging system of claim 1, wherein the illumination source is present and comprises an LED ring light.

7. The imaging system of claim 1, wherein the lens comprises a single lens, or a compound lens comprising several simple lenses, or an objective lens.

8. The imaging system of claim 1, wherein the lens comprises a telecentric lens.

9. The imaging system of claim 8, wherein the lens comprises an object-space telecentric lens.

10. The imaging system of claim 8, wherein the lens comprises a double telecentric lens.

11. The imaging system of claim 1, wherein the pixel size of the image sensor is less than about 5 microns.

12. The imaging system of claim 1, wherein the image sensor comprises a CCD chip or a CMOS chip.

13. The imaging system of claim 1, wherein the image processor comprises a computer or an embedded processor in an embedded system.

14. The imaging system of claim 1, wherein the image processor associates the position of the particle with the center of the intensity distribution for multiple pixels of the image sensor.

15. The imaging system of claim 14, wherein a center of the particle is calculated by fitting a Gaussian surface to an intensity profile of an image of the particle.

16. The imaging system of claim 14, wherein a center of the particle is obtained as a geometric center of a binary image of the particle.

17. The imaging system of claim 1, wherein the image processor is configured to determine the movement of the particle by determining a first position and a second position of the particle, and calculating a displacement between said first position and the second position.

18. A method of determining a position or a movement of a particle in a sample, comprising the steps of:

a. providing a sample having a particle, wherein a size of the particle is less than about 20 microns;

b. optionally illuminating the sample;

c. optionally positioning the sample along an optical axis of a lens at a distance from a focal plane of the lens that is greater than a depth of field of the lens;

d. generating a blurred image of the particle with the lens having a magnification ratio of from about 1:5 to about 5:1, wherein a dimension of the blurred image of the particle is greater than the dimension of the particle multiplied by the magnification ratio of the lens, and wherein a field of view in an image plane of the lens is larger than twice the size of the particle;

e. sensing the blurred image of the particle on at least two pixels of an image sensor having a pixel size of less than about the dimension of the blurred image of the particle wherein an intensity of the blurred image of the particle is distributed on at least two pixels of the image sensor to form an intensity distribution; and f. processing an image of the sample, including finding a center of an intensity distribution for at least two pixels within a high precision, sub-pixel particle position measurement resolution, to measure the position or the movement of the particle, wherein a size of the particle is less than a dimension of about five pixels and wherein finding the center of the intensity distribution comprises at least one of finding a two dimensional fit to the intensity distribution and finding a geometric center of a bead image based on a threshold of the intensity distribution.

19. The method of claim 18, wherein the sample is located on a capillary or a glass slide.

20. The method of claim 18, wherein the size of the particle is from about 0.5 microns to about 2 microns.

21. The method of claim 18, wherein there are from about 100 particles to about 1 million particles in an imaged area of the sample.

22. The method of claim 18, wherein the sample is illuminated with a bright-field illumination or a dark-field illumination.

23. The method of claim 18, wherein the sample is illuminated with an LED ring light.

24. The method of claim 18, wherein the lens comprises a single lens, or a compound lens comprising several simple lenses, or an objective lens.

25. The method of claim 18, wherein the lens comprises a telecentric lens.

26. The method of claim 25, wherein the lens comprises an object-space telecentric lens.

27. The method of claim 25, wherein the lens comprises a double telecentric lens.

28. The method of claim 18, wherein the magnification ratio of the lens is from about 1:10 to about 10:1.

29. The method of claim 18, wherein the pixel size of the image sensor is less than about 5 microns.

30. The method of claim 18, wherein the image sensor comprises a CCD chip or a CMOS chip.

31. The method of claim 18, wherein processing an image of the sample comprises using a computer or an embedded processor in an embedded system.

32. The method of claim 18, wherein a center of the particle is calculated as the position of the particle.

33. The method of claim 32, wherein the center of the particle is calculated by fitting a Gaussian mode to an intensity profile of an image of the particle.

34. The method of claim 32, wherein the center of the particle is obtained as a geometric center of a binary image of the particle.

35. The method of claim 18, wherein the movement of the particle is determined by using steps a through f to determine a first position and a second position of the particle, and calculating a displacement between the first position and the second position of the particle.

* * * * *